(12) United States Patent
Kornrumpf

(10) Patent No.: US 6,843,515 B2
(45) Date of Patent: Jan. 18, 2005

(54) AIRCRAFT COOLING SYSTEM WITH FLUID AND PRESSURE-TIGHT PIPE JUNCTIONS

(75) Inventor: Manfred Kornrumpf, Buxtehude (DE)

(73) Assignee: Airbus Deutschland GmbH, Hamburg (DE)

( * ) Notice: Subject to any disclaimer, the term of this patent is extended or adjusted under 35 U.S.C. 154(b) by 0 days.

(21) Appl. No.: 10/237,161

(22) Filed: Sep. 6, 2002

(65) Prior Publication Data

US 2003/0057290 A1 Mar. 27, 2003

(30) Foreign Application Priority Data

Sep. 8, 2001 (DE) .......................................... 101 44 277

(51) Int. Cl.$^7$ ................................................ F16L 47/00
(52) U.S. Cl. ..................... 285/381.1; 285/226; 285/229
(58) Field of Search ......................... 285/381.1, 381.2, 285/381.3, 381.4, 381.5, 235, 236, 299, 300, 226

(56) References Cited

U.S. PATENT DOCUMENTS

| | | | |
|---|---|---|---|
| 2,193,141 A | | 3/1940 | Price |
| 3,632,144 A | * | 1/1972 | Shire et al. ................. 285/231 |
| 3,957,382 A | * | 5/1976 | Greuel et al. ................. 403/27 |
| 4,092,193 A | * | 5/1978 | Brooks ........................ 156/83 |
| 4,135,743 A | * | 1/1979 | Hughes ....................... 285/115 |
| 4,440,821 A | * | 4/1984 | Komura et al. .......... 428/195.1 |
| 4,578,855 A | * | 4/1986 | Van Der Hagen ............ 29/447 |
| 4,717,608 A | * | 1/1988 | Meltsch ..................... 428/35.1 |
| 4,732,412 A | * | 3/1988 | van der Linden et al. ..... 285/47 |
| 4,765,660 A | * | 8/1988 | Maier ......................... 285/229 |
| 4,835,977 A | * | 6/1989 | Haglund et al. ............... 62/89 |
| 4,896,904 A | * | 1/1990 | Gadsden et al. ......... 285/381.5 |
| 5,174,616 A | * | 12/1992 | Hagio et al. ............. 285/381.3 |
| 5,470,622 A | * | 11/1995 | Rinde et al. ............... 428/34.9 |
| 5,720,656 A | * | 2/1998 | Savage ....................... 454/119 |
| 5,755,465 A | * | 5/1998 | Stewart et al. .......... 285/381.5 |
| 5,770,139 A | * | 6/1998 | Kinghorn et al. ........... 264/230 |
| 5,803,128 A | * | 9/1998 | Reed .......................... 138/123 |
| 6,355,318 B1 | * | 3/2002 | Tailor et al. ............... 428/34.9 |

FOREIGN PATENT DOCUMENTS

DE 2527838 1/1977

* cited by examiner

Primary Examiner—Eric K. Nicholson
(74) Attorney, Agent, or Firm—W. F. Fasse; W. G. Fasse

(57) ABSTRACT

A cooling system in an aircraft has fluid flow pipe sections that aremounted to the aircraft structure. The pipe sections have pipe ends that form part of pipe junctions. The two pipe ends of a pipe junction are facing each other and are surrounded by a shrunk hose member of a shrinkable material which overlaps both pipe ends in a fluid- and pressure-tight manner.

3 Claims, 1 Drawing Sheet

AIRCRAFT COOLING SYSTEM WITH FLUID AND PRESSURE-TIGHT PIPE JUNCTIONS

PRIORITY CLAIM

This application is based on and claims the priority under 35 U.S.C. §119 of German Patent Application 101 44 277.7, filed on Sep. 8, 2001, the entire disclosure of which is incorporated herein by reference.

FIELD OF THE INVENTION

The invention relates to cooling systems for aircraft in which pipe sections are interconnected with pressure and fluid-tight pipe junctions.

BACKGROUND INFORMATION

Cooling systems in aircraft are used primarily for air conditioning purposes in a passenger cabin and for refrigerating purposes in an aircraft galley. Such cooling systems include a substantial number of pipes that cannot be conveniently installed in their full length in the system. Therefore, it is necessary to divide the pipes into pipe sections which must be interconnected by pressure- and fluid-tight pipe junctions. These pipes transport either air or a coolant. The pipe ends of individual pipe sections are interconnected either by metal or rubber-type pipe junction elements. Metal junction elements are usually formed as hard or stiff sleeves while rubber or elastomeric type junctions are frequently formed as flexible soft bellows. Both types of junction elements are secured to the respective pipe ends that face each other by overlapping the pipe ends and by so-called hose clamps constructed as single or double shell clamps. Two such clamps are required for each junction for tying each end of the junction element to a respective pipe end.

These hose clamps are conventionally made of stainless steel and are used by most aircraft manufacturers such as Airbus, Boeing, McDonnell Douglas, Tupolev and so forth. One drawback of so-called junctions with hose clamps is seen in that the required fluid and pressure tightness for positive and negative pressures is not always achieved with the desired certainty or cannot be maintained for a desirable useful life of such pipe junctions. This problem requires, where it exists, substantial additional work by individually retightening the hose clamps, for example prior to delivery of an aircraft to a customer or during repair and maintenance operations. This problem is even aggravated where individual customers have special air conditioning and/or cooling requirements. Another drawback is seen in the fact that keeping substantial numbers of hose clamps of different sizes in stock is not very efficient. Moreover, conventional pipe junctions with hose clamps in an aircraft have a cumulative weight adding effect since all hose clamps together can have a substantial weight.

German Patent Publication DE-OS 25 27 838 (Lesk) relates to pipe junctions particularly for air pressure and suction pipes in which the junctions are formed between pipe ends facing each other by a shrink hose section. Lesk discloses various types of pipe ends that face each other and are joined to each other by a shrunk hose section of shrinkable material. Flanged pipe ends and pipe ends inserted one into the other are bridged and interconnected a shrunk hose section. No suggestions are made that such pipe junctions are suitable for use under the rigorous operating conditions in aircraft cooling systems which must also satisfy stringent government regulations applicable to aircraft cooling systems.

OBJECTS OF THE INVENTION

It is the aim of the invention to achieve the following objects singly or in combination:

- to avoid the above outlined problems that are encountered in the construction of aircraft cooling systems with pipe junctions including hose clamps;
- to provide pressure and fluid-tight pipe junctions in aircraft cooling systems that can be more efficiently installed than conventional flexible bellows or rigid sleeve junctions with hose clamps; and
- to reduce the technical effort and expense for the construction of the pipe junctions while simultaneously achieving some weight reduction as well as an assured fluid and pressure tightness.

SUMMARY OF THE INVENTION

The above objects have been achieved according to the invention by a cooling system in an aircraft, wherein the cooling system comprises fluid flow pipes including pipe sections mounted in the aircraft so that pipe section ends forming a pair face each other and wherein the pipe section ends of a pair are interconnected by fluid- and pressure-tight junctions formed by a shrunk hose member having hose ends encircling the pipe section ends with a shrink fit.

According to the invention there is further provided a method for forming a fluid- and pressure-tight junction between pipe ends that face each other in a cooling system in an aircraft. The present method comprises the following steps. First, a shrinkable hose member is selected to have an initial diameter that fits onto an outer diameter of the pipe ends. Second, the pipe ends are inserted into the shrinkable hose member so that a sufficient overlap of the hose member on the pipe ends is achieved. The overlap is sufficient if, after performing a shrinking step, the junction is fluid- and pressure-tight in accordance with official regulations. Next, the shrinking is performed by applying heat to the hose member with a temperature and time duration that assures the proper shrinking in accordance with shrinking rates and shrinking conditions provided by the manufacturer of the shrinkable hose material.

The pipe ends that face each other are preferably, but not necessarily, axially aligned with each other prior to shrinking. An adhesive may be applied to an inner surface of the shrinkable member prior to insertion of the pipe ends. The inner surface of the shrinkable member may be roughened prior to applying the adhesive.

It is an advantage of the invention that conventional hose clamps have been avoided altogether in aircraft cooling systems and that the present junctions are more reliable than hose clamp junctions.

BRIEF DESCRIPTION OF THE DRAWINGS

In order that the invention may be clearly understood, it will now be described in connection with an example embodiment, with reference to the accompanying drawings, wherein.

DETAILED DESCRIPTION OF PREFERRED EXAMPLE EMBODIMENTS AND OF THE BEST MODE OF THE INVENTION

Figure 1:
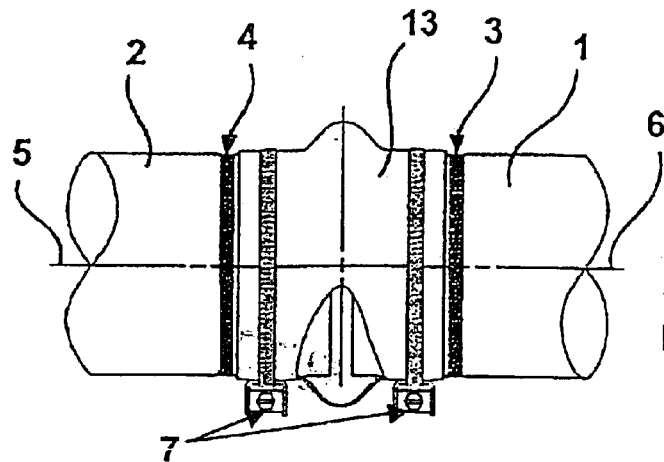
FIGS. 1 and 2 illustrate conventional pipe junctions with hose clamps.
Figure 2:
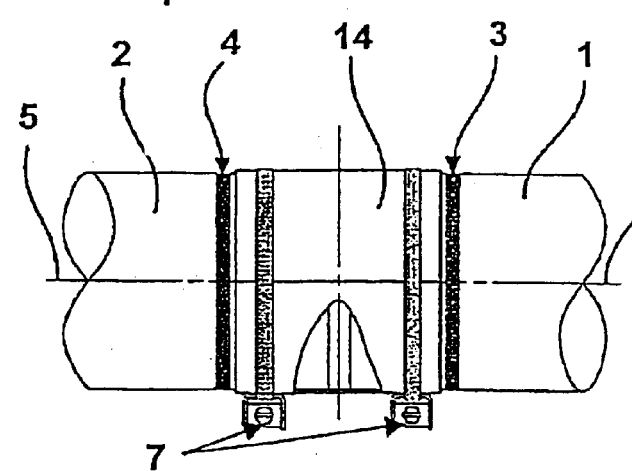

FIGS. 1 and 2 show conventional pipe junctions between two pipe ends 1 and 2 that face each other and are preferably axially aligned with their axes 5 and 6. The pipe ends 1 and 2 are provided with markers 3 and 4 to indicate the necessary overlap of the ends of the junction forming members 13 in FIG. 1 and 14 in FIG. 2. FIG. 1 illustrates a so-called bellows junction member 13 while FIG. 2 illustrates a so-called sleeve junction member 14.

At least one hose clamp 7 is required for each pipe end 1 and 2 overlapped by a portion of the junction member 13 or 14. Thus, each junction requires at least two hose clamps 7. The hose clamps 7 are usually made of stainless steel and their sum total weight contributes to the weight of the aircraft. The invention has avoided the use of such hose clamps altogether.

Figure 3:
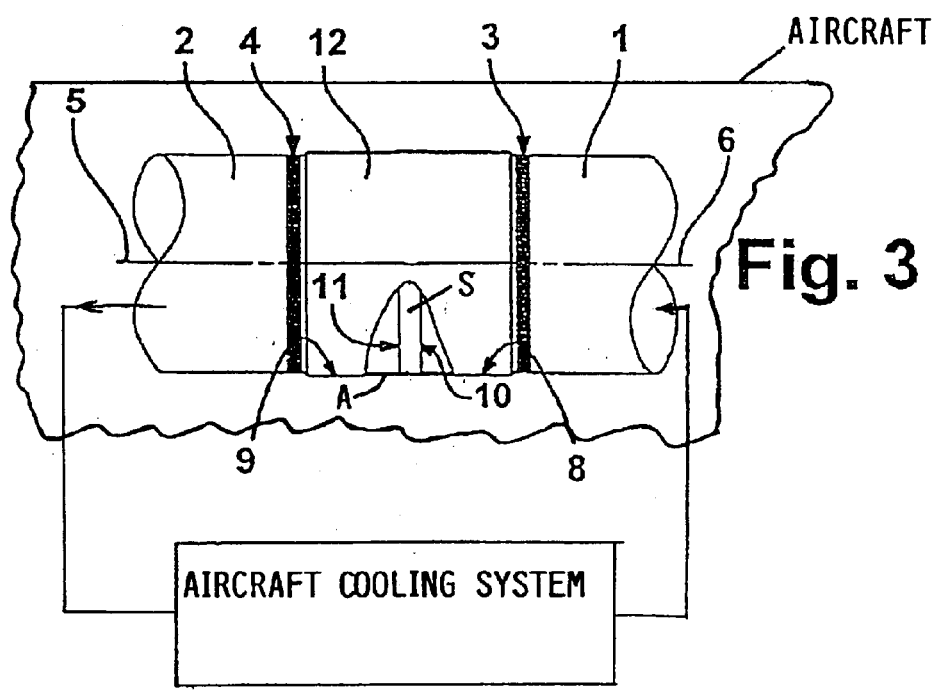
FIG. 3 illustrates schematically a pipe junction according to the invention as part of an aircraft cooling system.

FIG. 3 shows a shrunk pipe junction between two pipe sections 1 and 2 that form part of a cooling system in an aircraft according to the invention. The pipe sections 1 and 2 are secured to the aircraft structure either directly or by supporting members which space the pipes from the aircraft structure. It is preferable but not necessary that the axes 5 and 6 of the pipe ends 1 and 2 are axially aligned with each other at least along a certain overlap length 8 and 9 between the pipe end edge 10 and 11 on the one hand and the respective markers 3 and 4 on the other hand. The shrinkable hose member 12 has already been shrunk in FIG. 3 so that a fluid- and pressure-tight junction has been established. FIG. 3 further shows that a spacing S remains between the pipe end edges 10 and 11 after the shrinking is completed.

As mentioned, it is not necessary to absolutely axially align the pipe ends since the shrinkable hose member 12 retains some flexibility even after shrinking and particularly along the spacing S and thus permits a certain tolerance in the positioning of the pipe ends which is an advantage for the installation. Once the shrinking is completed, for example by the application of sufficient heat for a sufficient duration of time, a pressure- and fluid-tight junction is achieved without any hose clamps. Due to the spacing S between the pipe end edges 10, 11 in combination with the retained flexibility of the hose member 12 the junction according to the invention functions as a bellows junction without a bellows.

The present method is performed by ascertaining the shrinking rate. This information is usually provided by the manufacturer of the shrinkable hose material. The shrinking rate indicates the diameter reduction of the shrinkable hose member in response to heat application, whereby it is possible to select the original, preshrink diameter in accordance with the outer diameters of the pipe ends to be joined, so that initially the shrinkable member can be easily slipped onto the two pipe ends or the pipe ends can be easily inserted into the junction forming shrinkable hose member. After selection of the proper diameters and insertion heat is applied at the required temperature for required time duration to form the fluid- and pressure-tight junction between the two ends.

It is possible to further improve the connection between the inner surface of the shrinkable hose member and the outer surface of the respective pipe end by applying an adhesive A either to the pipe end or to the inner surface of the hose member prior to shrinking. A further improvement is obtained by roughening the inner surface of the shrinkable hose member or pipe end prior to inserting the pipe end.

Preferably, the adhesive A is applied to the roughened inner surface of the hose member or pipe end prior to the insertion of the pipe ends. A suitable adhesive A is sold under the trade name "Helmitin 35050" which is a synthetic adhesive sold by "Forbo-Helmitin GmbH", Federal Republic of Germany. The use of an adhesive A in addition to the shrinking has been found to increase the tightness so that the junction can withstand higher positive or negative pressures without impairing the flexibility across the spacing S.

The material of the shrinkable hose member for forming the junctions should have the following characteristics: the maximum shrinking temperature should be within the range of 120° to 135° C., whereby the shrinking time at the lower end of the range is about 1 to 2 minutes while at the upper limit the shrinking time is about 30 seconds. The material should be capable of maintaining its characteristics within a temperature range of −40° C. to +95° C. The material must be so dimensioned that it withstands a maximal operational pressure within the range of −30 mbar up to +30 mbar. The material must withstand a testing pressure of +45 mbar and the bursting pressure must be +90 mbar. Further, the material should have a work life of about 60,000 flight hours. Additionally, the material must meet the national and international regulations regarding combustability, smoke generation, and toxic characteristics.

The material for the shrinkable hose member may be selected from the following so-called E-fiber glass materials, PVCs in their soft and rigid forms, polyolefin, PVDF, elastomeric materials, PTFE, FEP, MFA, PFA, PTFE-FEP materials, silicone, LD-PE materials, polyurethane, PEEK materials, and ETFE materials, provided these materials have the required shrinkability.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. An aircraft comprising a cooling system, said cooling system comprising fluid flow pipes including pipe sections (1, 2) having pipe ends (10, 11) arranged to face each other, a spacing (S) between said pipe ends (10, 11) facing each other, a shrunk hose member (12) having hose ends (8, 9) encircling and overlapping said pipe ends facing each other thereby forming a pipe junction with a shrink fit providing a fluid and pressure tight seal between said hose ends and said pipe ends, said shrunk hose member having between its hose ends a hose portion bridging said spacing (S), said hose portion having, after shrinking, a flexibility which in combination with said spacing (S) between said pipe ends permits a tolerance in the positioning of said pipe ends relative to each other when said pipe sections are being installed in said aircraft, said flexibility along said spacing (S) taking up vibrations during operation of said aircraft, and wherein said shrunk hose member is made of a material having the following characteristics in combination, a shrink temperature within the range of 125° C. to 135° C., a temperature resistance within the range of −40° C. to +95° C., an operational pressure resistance within the range of −30 mbar to +30 mbar, a testing pressure resistance up to and +45 mbar, a burst pressure of at least +95 mbar, and is non-toxic.

2. The aircraft of claim 1, further comprising an adhesive between an outer surface of said pipe ends and an inner surface of said hose ends, said adhesive being pressure-, water-, and coolant-resistant.

3. A method for forming a flexible fluid end pressure-tight pipe junction between two pipe ends in an aircraft, said method comprising the following steps:
a) using a shrinkable hose member made of a material that is heat shrinkable within a temperature range of 125° C. to 135° C. and during a shrinking time within a time range of 0.5 minutes to 2.0 minutes,
b) selecting said shrinkable hose member to have an initial inner diameter that fits onto an outer diameter of said two pipe ends and retains a flexibility after a shrinking step is completed,
c) inserting said pipe ends into said shrinkable hose member to such an extent that a spacing (S) remains between said pipe ends facing each other inside said hose member, and
d) heating said shrinkable hose member to ate a temperature within said temperature range for a duration within said time range, thereby shrinking said shrinkable hose member onto said pipe junction to form a fluid- and pressure-tight pipe junction that remains flexible.

* * * * *

UNITED STATES PATENT AND TRADEMARK OFFICE
CERTIFICATE OF CORRECTION

PATENT NO. : 6,843,515 B2
DATED : January 18, 2005
INVENTOR(S) : Kornrumpf

It is certified that error appears in the above-identified patent and that said Letters Patent is hereby corrected as shown below:

Column 4,
Line 61, after "and", insert -- including --.

Column 5,
Line 1, after "fluid", replace "end" by -- and --.

Column 6,
Line 5, after "to", delete "ate".

Signed and Sealed this

Seventh Day of June, 2005

JON W. DUDAS
*Director of the United States Patent and Trademark Office*